United States Patent
Osawa et al.

(10) Patent No.: US 11,382,051 B2
(45) Date of Patent: Jul. 5, 2022

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/048,465

(22) PCT Filed: Apr. 18, 2019

(86) PCT No.: PCT/JP2019/016698
§ 371 (c)(1),
(2) Date: Oct. 16, 2020

(87) PCT Pub. No.: WO2019/203323
PCT Pub. Date: Oct. 24, 2019

(65) Prior Publication Data
US 2021/0160793 A1 May 27, 2021

(30) Foreign Application Priority Data
Apr. 18, 2018 (JP) .............................. JP2018-090963

(51) Int. Cl.
*H04W 52/42* (2009.01)
*H04W 52/08* (2009.01)
*H04W 72/04* (2009.01)

(52) U.S. Cl.
CPC ........... *H04W 52/42* (2013.01); *H04W 52/08* (2013.01); *H04W 72/042* (2013.01); *H04W 72/044* (2013.01)

(58) Field of Classification Search
CPC ... H04W 52/42; H04W 52/08; H04W 72/042; H04W 72/044; H04W 52/245; H04W 52/365; H04W 52/58
See application file for complete search history.

(56) References Cited

U.S. PATENT DOCUMENTS

| | | | |
|---|---|---|---|
| 2012/0208583 A1* | 8/2012 | Chung | H04W 52/34 455/509 |
| 2012/0236767 A1* | 9/2012 | Zhu | H04W 52/34 370/280 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Dominic E Rego
(74) *Attorney, Agent, or Firm* — Osha Bergman Watanabe & Burton LLP

(57) ABSTRACT

The present invention is directed to suppress deterioration of communication throughput and so on even when a group common TPC command is used. In accordance with one aspect of the present disclosure, a user terminal has a receiving section that receives downlink control information (DCI) regarding transmit power control (TPC) commands transmitted in a common search space and a control section that identifies a position of a TPC command corresponding to each of carriers included in the DCI based on information regarding positions of the TPC commands for the respective carriers in a cell.

4 Claims, 7 Drawing Sheets

(56) References Cited

U.S. PATENT DOCUMENTS

| | | | |
|---|---|---|---|
| 2013/0064119 A1* | 3/2013 | Montojo | H04W 72/0453 370/252 |
| 2013/0182654 A1 | 7/2013 | Hariharan et al. | |
| 2019/0150183 A1* | 5/2019 | Aiba | H04W 72/0446 370/336 |
| 2019/0253986 A1* | 8/2019 | Jeon | H04W 72/042 |
| 2019/0254073 A1* | 8/2019 | Sheng | H04W 74/0833 |
| 2019/0254110 A1* | 8/2019 | He | H04L 5/0048 |
| 2019/0306841 A1* | 10/2019 | Huang | H04W 76/34 |
| 2020/0266964 A1* | 8/2020 | Kang | H04L 5/10 |
| 2020/0267706 A1* | 8/2020 | Babaei | H04W 72/042 |
| 2021/0266842 A1* | 8/2021 | Wernersson | H04W 52/42 |

OTHER PUBLICATIONS

3GPP TSG RAN WG1 Meeting #92bis; R1-1804736 "On Power Control Framework" Intel Corporation; Sanya, China Apr. 16-20, 2018 (5 pages).

TSG-RAN WG1 #92bis; R1-1804099 "Discussion on Remaining Issues for DCI" CMCC ; Sanya, China; Apr. 16-20, 2018 (7 pages).

International Search Report issued in International Application No. PCT/JP2019/016698, dated Jul. 2, 2019 (3 pages).

Written Opinion issued in International Application No. PCT/JP2019/016698; dated Jul. 2, 2019 (3 pages).

Extended European Search Report issued in counterpart European Patent Application No. 19787607.1, dated Feb. 8, 2022 (15 pages).

Huawei, HiSilicon; "Power control design for SUL and LNC"; 3GPP TSG RAN WG1 Meeting #91, R1-1719820; Reno, USA; Nov. 27-Dec. 1, 2017 (4 pages).

Vivo; "Other aspects on carrier aggregation"; 3GPP TSG RAN WG1 Meeting 91, R1-1719801; Reno, USA; Nov. 27-Dec. 1, 2017 (5 pages).

ZTE, Sanechips; "Offline summary for AI 7.6.1 NR UL power control in non-CA aspects"; 3GPP TSG RAFN WG1 Meeting AH 1801, R1-1801047; Vancouver, Canada; Jan. 22-26, 2018 (28 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see Non-Patent Literature 1). In addition, the specifications of LTE-A (LTE Advanced, LTE Rel. 10, 11, 12, and 13) have been drafted for the purpose of further increasing the capacity and enhancement of LTE (LTE Rel. 8 and 9).

Successor systems of LTE (for example, FRA (Future Radio Access), 5G (5th generation mobile communication system), 5G+ (plus), NR (New Radio), NX (New radio access), FX (Future generation radio access), LTE Rel.14 or 15 or later versions) are also under study.

In existing LTE (for example, LTE Rel. 8-13), a user terminal (User Equipment, UE) feeds back a Power Headroom Report (PHR) containing information regarding Power Headroom (PH) for each serving cell to a network side apparatus (for example, a base station).

A base station determines the uplink transmit power of a UE based on the PHR, and reports transmit power control (TPC) commands to the UE so that the uplink transmit power becomes appropriate.

CITATION LIST

Non-Patent Literature

Non-Patent Literature 1:3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a study is underway to report TPC commands collectively to a plurality of UEs. For example, downlink control information (DCI) format 2_2 transmitted in a common search space is used for transmitting a TPC command of at least one of PUCCH and PUSCH. DCI format 2_2 may be referred to as a DCI for UE group common TPC command.

A study is underway to, in a case where DCI format 2_2 is used, enable UEs to identify which closed loop (power control adjustment state) a TPC command reported to each UE corresponds to.

However, by DCI format 2_2 that has been studied so far, UEs cannot determine which carrier's closed loop a reported TPC command corresponds to. Without solving this problem appropriately, the power control of UEs may not be properly performed, and the communication throughput and so on may be deteriorated.

Therefore, it is an object of the present disclosure to provide a user terminal and a radio communication method that can suppress deterioration of communication throughput and so on even when a group common TPC command is used.

Solution to Problem

In accordance with one aspect of the present disclosure, a user terminal has a receiving section that receives downlink control information (DCI) regarding transmit power control (TPC) commands transmitted in a common search space, and a control section that identifies a position of a TPC command corresponding to each of carriers included in the DCI based on information regarding positions of the TPC commands for the respective carriers in a cell.

Advantageous Effects of Invention

According to one aspect of the present disclosure, it is possible to suppress deterioration of communication throughput and so on even when a group common TPC command is used.

DESCRIPTION OF EMBODIMENTS

Figure 1:
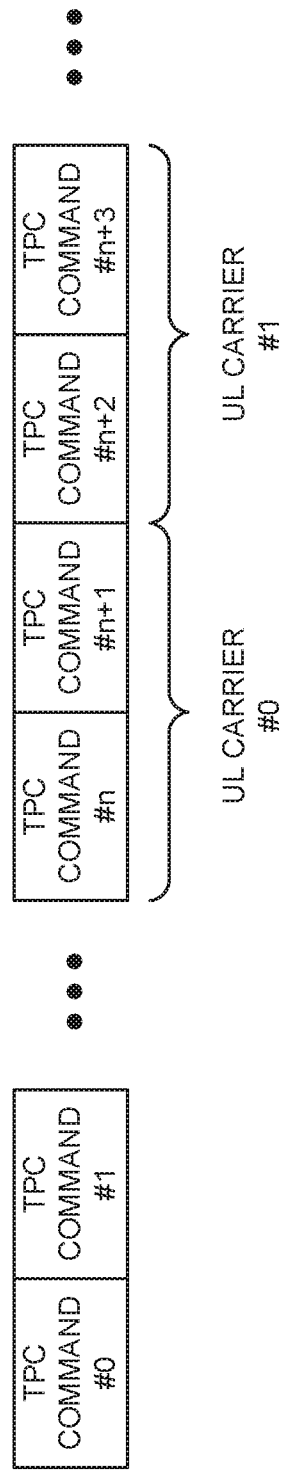
FIG. 1 is a diagram to show an example of information reported by DCI format 2_2 according to one embodiment.

In NR, transmit power of a UE is controlled using open loop transmit power control and closed loop transmit power control. The UE corrects the error of the open loop control by the closed loop control using a transmit power control (TPC) command received from a base station.

For example, the transmit power of an uplink shared channel (PUSCH (Physical Uplink Shared Channel)), an uplink control channel (PUCCH (Physical Uplink Control Channel)), an uplink measurement reference signal (SRS (Sounding Reference Signal)) and so on is subjected to transmit power control.

In NR, a study is underway to support up to two closed loops for each carrier of the serving cell.

For example, in NR, the transmit power $P_{PUSCH,c}(i)$ of the PUSCH in a transmission period i for a bandwidth part (BWP) b of a carrier f of a serving cell c may be represented by the following equation 1. Here, the transmission period may be, for example, symbols, slots, subframes, frames and so on.

$$P_{PUSCH,f,c}(i, j, q_d, l) = \qquad \text{[Equation 1]}$$

$$\min \left\{ \begin{array}{l} P_{CMAX,f,c}(i), \\ P_{O\_PUSCH,f,c}(j) + 10\log_{10}(2^{\mu} \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{array} \right\}$$

In equation 1, $f_{f,c}(i,l)$ is a value based on a TPC command (for example, a cumulative value based on the TPC command). The parameter l represents an index of the power control adjustment state. When a UE is set to maintain a plurality of (for example, 2) power control adjustment states of a predetermined channel (for example, PUSCH, PUCCH and so on) using, for example, a higher layer signaling, at least one of a plurality of values can be used as the parameter l. When such setting is not made, the UE may assume that one value is used (for example, l=0).

Here, the higher layer signaling may be, for example, any of RRC (Radio Resource Control) signaling, MAC (Medium Access Control) signaling, broadcast information and so on, or a combination thereof.

For the MAC signaling, for example, a MAC control element (MAC CE), a MAC PDU (Protocol Data Unit), or the like may be used. The broadcast information may be, for example, a master information block (MIB), a system information block (SIB), a minimum system information (Remaining Minimum System Information (RMSI)), other system information (OSI), or the like.

For example, when an RRC parameter "twoPUSCH-PC-AdjustmentStates" is set for the PUSCH, the UE may determine that 2 power control states are used for transmit power control of the PUSCH.

Note that for other uplink signals (for example, an uplink control channel (PUCCH (Physical Uplink Control Channel)), an uplink measurement reference signal (SRS (Sounding Reference Signal)) and so on), it is possible to determine the transmit power using a plurality of power control adjustment states similar to PUSCH, although there are differences in parameters to be used.

In the present disclosure, a closed loop and a power control adjustment state may be interpreted interchangeably.

In NR, a study is underway to report TPC commands collectively to a plurality of UEs. For example, downlink control information (DCI) format 2_2 transmitted in a common search space is used for transmitting a TPC command of at least one of PUCCH and PUSCH. DCI format 2_2 may be referred to as a DCI for UE group common TPC command. TPC commands reported by DCI format 2_2 may be referred to as group common TPC commands.

DCI format 2_2 may be cyclic redundancy check (CRC) scrambled by an identifier for TPC of the PUSCH (TPC-PUSCH-RNTI (Radio Network Temporary Identifier)), or may be CRC scrambled by an identifier for TPC of the PUCCH (TPC-PUCCH-RNTI).

A study is underway to, in a case where DCI format 2_2 is used, enable UEs to identify which closed loop (power control adjustment state) a TPC command reported to each UE corresponds to. A study is underway to, for example, make DCI format 2_2 include a field for a closed loop index to which a TPC command included in the DCI is to be applied.

However, even if DCI format 2_2 clarifies which closed loop a reported TPC command corresponds to, in a case where there is a plurality of UE carriers (UE can use a plurality of UL carriers), a UE cannot determine which carrier's closed loop the TPC command reported by DCI format 2_2 corresponds to. Without solving this problem appropriately, the power control of UEs may not be properly performed, and the communication throughput and so on may be deteriorated.

Note that a case where a UE can use a plurality of UL carriers may be, for example, a case where one DL carrier and a plurality of UL carriers in the frequency division duplex (FDD) band are set for the UE and a case where a SUL (Supplemental Up Link) is set in addition to one DL carrier and one UL carrier.

Therefore, the present inventors have come up with the idea of a method and related operations for determining which carrier a TPC command reported by DCI format 2_2 corresponds to even when a UE uses a plurality of UL carriers and a plurality of closed loops (power control adjustment states) are set in at least one of the carriers.

Hereinafter, embodiments according to the present disclosure will be described in detail with reference to the drawings. The radio communication methods according to the respective embodiments may be applied independently or in combination.

The following embodiment will be described assuming that a plurality of closed loops (power control adjustment states) is set (use (or maintenance) of a plurality of closed loops is set) for a UE.

Note that DCI format 2_2 may be interpreted as the DCI format in which a group common TPC command is reported. The "DCI format" may be interpreted as "DCI following the DCI format" or simply "DCI".

(Radio Communication Method)

In one embodiment, a UE may, based on any of the following (1)-(4) or a combination thereof, determine (identify) a carrier corresponding to a group common TPC command included in DCI format 2_2:

(1) Information regarding the position of a TPC command for each carrier;
(2) Rule of arrangement order of TPC commands;
(3) RNTI; and
(4) Carrier designation field.

In the case where option (1) described above is used, information regarding the position of the TPC command for each carrier included in DCI format 2_2 may be reported to the UE by using higher layer signaling (for example, RRC signaling, MAC signaling), physical layer signaling (for example, DCI) or a combination thereof.

The information regarding the position of the TPC command may be the number of bits of DCI format 2_2 from a predetermined bit (for example, the start bit), may be the index of the TPC command, or may be a DCI format 2_2 bitmap.

FIG. 1 is a diagram to show an example of information reported by DCI format 2_2 according to one embodiment. In this example, DCI format 2_2 includes a plurality of group common TPC commands. Among the group common TPC commands, TPC commands #n and #n+1 correspond to UL carrier #0, and TPC commands #n+2 and #n+3 correspond to UL carrier #1.

The information regarding the position of a TPC command for a certain carrier may be information indicating the first position (or last position) of the TPC command corresponding to the carrier. For example, in the example of FIG. 1, information indicating that the TPC command #n is the first position of the UL carrier #0 and the TPC command #n+2 is the first position of the UL carrier #1 may be reported to a UE. The UE can identify a TPC command corresponding to each closed loop index of a carrier based on the set number of closed loops.

Note that the information regarding the position of the TPC command for a certain carrier may include information indicating the positions of the TPC commands corresponding to the carrier for respective closed loop indexes. For example, in the example of FIG. 1, information indicating that TPC command #n is a TPC command for closed loop index 0 of UL carrier #0, and TPC command #n+1 is a TPC command for closed loop index #1 of UL carrier #0 may be reported to the UE.

In the case where option (2) described above is used, UEs may assume that TPC commands for respective carriers are included in DCI format 2_2 in the arrangement order according to a specific rule. For example, UEs may assume that the TPC commands included in DCI format 2_2 are arranged sequentially in ascending or descending order of the carrier number (may be referred to as component carrier index, cell index, SCell (secondary cell) index and so on).

Note that, in a case where, for example, the first position of each carrier is grasped (specified and so on), TPC commands of a certain carrier may be allocated non-sequentially in DCI format 2_2.

In the case where option (3) described above is used, TPC commands included in a certain DCI format 2_2 have a one-to-one correspondence with a certain carrier. A base station CRC scrambles DCI format 2_2 including TPC commands of a certain carrier by using RNTI corresponding to the carrier and transmits the resultant. All TPC commands included in one DCI format 2_2 may correspond to one carrier.

A UE decodes the DCI format 2_2 assuming an RNTI for each carrier. Note that decoding may be interpreted as monitoring, blind detecting, blind decoding and so on. For example, in a case where two UL carriers are set, a UE may monitor DCI format 2_2 using TPC-PUSCH-RNTI #0 for PUSCH TPC for the first UL carrier and TPC-PUSCH-RNTI #1 for PUSCH TPC for the second UL carrier.

The correspondence between RNTIs and UL carriers may be defined in the specification, or may be reported by higher layer signaling (for example, RRC signaling or MAC signaling), physical layer signaling (for example, DCI) or a combination thereof.

Note that one RNTI may correspond to one or more UL carriers.

In the case where option (4) described above is used, TPC commands included in a certain DCI format 2_2 have a one-to-one correspondence with a certain carrier. A base station transmits a DCI format 2_2 including a TPC command for a certain carrier with information indicating the carrier included in a carrier designation field of the DCI format 2_2. All TPC commands included in one DCI format 2_2 may correspond to one carrier.

A UE determines a carrier to which the TPC command in DCI format 2_2 is applied based on the value in the carrier designation field included in DCI format 2_2.

The correspondence between values in the carrier designation field and UL carriers may be defined in the specification, or may be reported by higher layer signaling (for example, RRC signaling or MAC signaling), physical layer signaling (for example, DCI) or a combination thereof.

According to the embodiment described above, a UE can appropriately acquire a group common TPC command corresponding to a certain closed loop of a certain carrier even when the UE uses a plurality of UL carriers and a plurality of closed loops (power control adjustment states) is set in at least one of the carriers.

(Radio Communication System)

Now, the structure of a radio communication system according to the embodiment of the present disclosure will be described below. In this radio communication system, communication is performed using at least one of the radio communication methods described in the embodiments described above.

Figure 2:
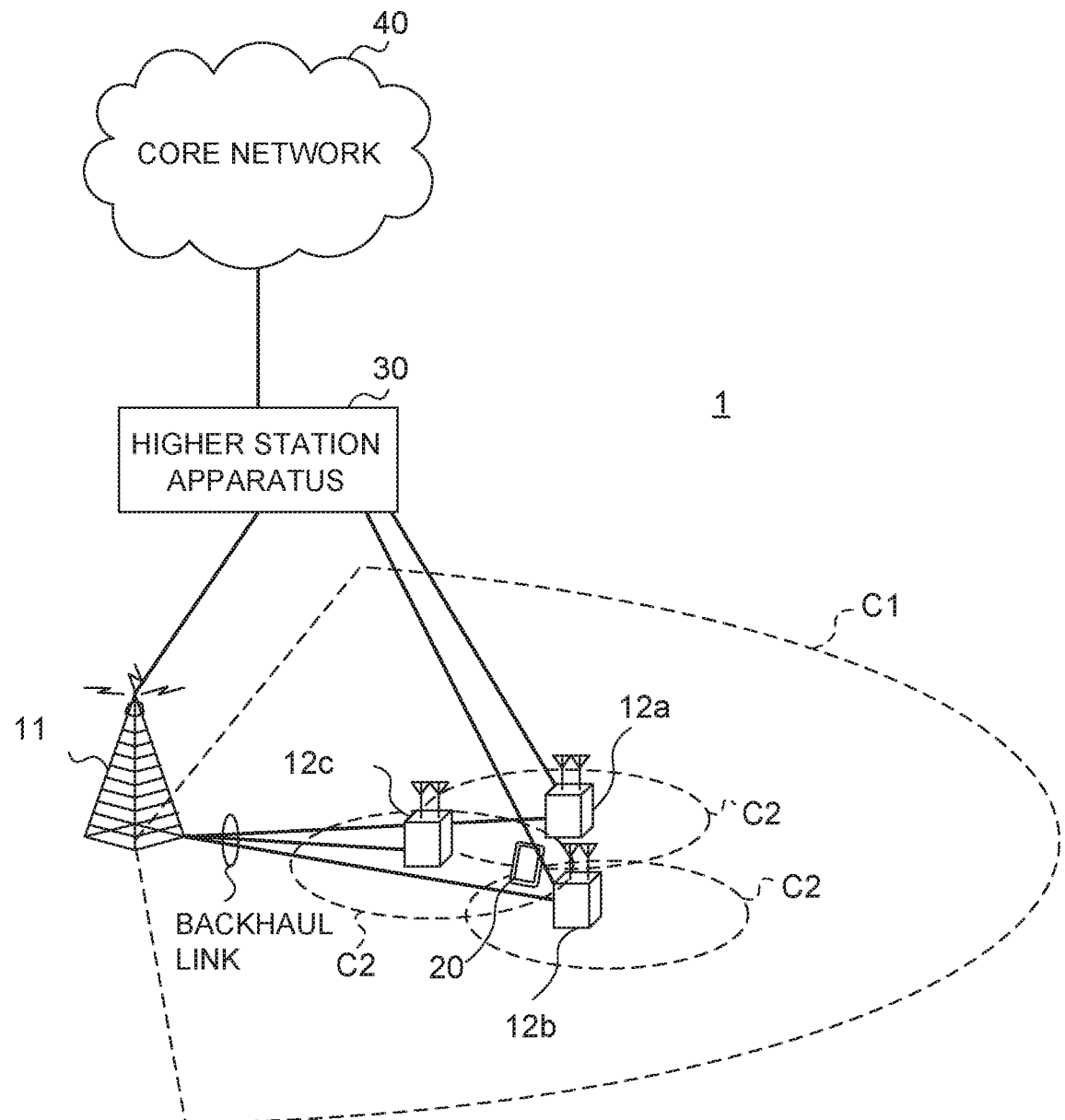
FIG. 2 is a diagram to show an example of a schematic structure of a radio communication system according to one embodiment.

FIG. 2 is a diagram to show an example of a schematic structure of a radio communication system according to one embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time using CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

The user terminals 20 can carry out communication in each cell using time division duplex (TDD) and/or frequency division duplex (FDD). In each cell (carrier), a single numerology may be used, or a plurality of different numerologies may be used.

The numerology may be a communication parameter used for transmission and/or reception of a certain signal and/or channel, and may indicate, for example, at least one of SubCarrier Spacing, a bandwidth, a symbol length, a cyclic prefix length, a subframe length, a TTI length, the number of symbols per TTI, a radio frame structure, a specific filtering process to be performed by a transceiver in the frequency domain, a specific windowing process to be performed by a transceiver in the time domain and so on.

For example, for a certain physical channel, when the subcarrier spacing differs and/or the numbers of OFDM symbols are different between the constituent OFDM symbols, this case may be described that they are different in numerology.

The radio base station 11 and the radio base station 12 (or between 2 radio base stations 12) may be connected by wire (for example, means in compliance with the CPRI (Common Public Radio Interface) such as optical fiber, an X2 interface and so on) or wirelessly.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these and other radio access schemes can be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) and so on are communicated in the PDSCH. Also, the MIB (Master Information Block) is communicated in the PBCH.

The downlink L1/L2 control channels include at least one of a downlink control channel (PDCCH (Physical Downlink Control CHannel) and/or an EPDCCH (Enhanced Physical Downlink Control CHannel)), a PCFICH (Physical Control Format Indicator CHannel), and a PHICH (Physical Hybrid-ARQ Indicator CHannel). Downlink control information (DCI), including PDSCH and/or PUSCH scheduling information, and so on, is communicated by the PDCCH.

Note that scheduling information may be reported via DCI. For example, the DCI to schedule receipt of DL data may be referred to as "DL assignment," and the DCI to schedule transmission of UL data may be referred to as "UL grant."

The number of OFDM symbols to use for the PDCCH is communicated by the PCFICH. HARQ (Hybrid Automatic Repeat reQuest) delivery acknowledgement information (also referred to as, for example, "retransmission control information," "HARQ-ACKs," "ACK/NACKs," etc.) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio link quality information (CQI (Channel Quality Indicator)), delivery acknowledgement information, scheduling requests (SRs) and so on are communicated. By means of the PRACH, random access preambles for establishing connections with cells are communicated.

In the radio communication systems 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that, DMRSs may be referred to as "user terminal-specific reference signals (UE-specific Reference Signals)." Also, the reference signals to be communicated are by no means limited to these.

<Radio Base Station>

Figure 3:
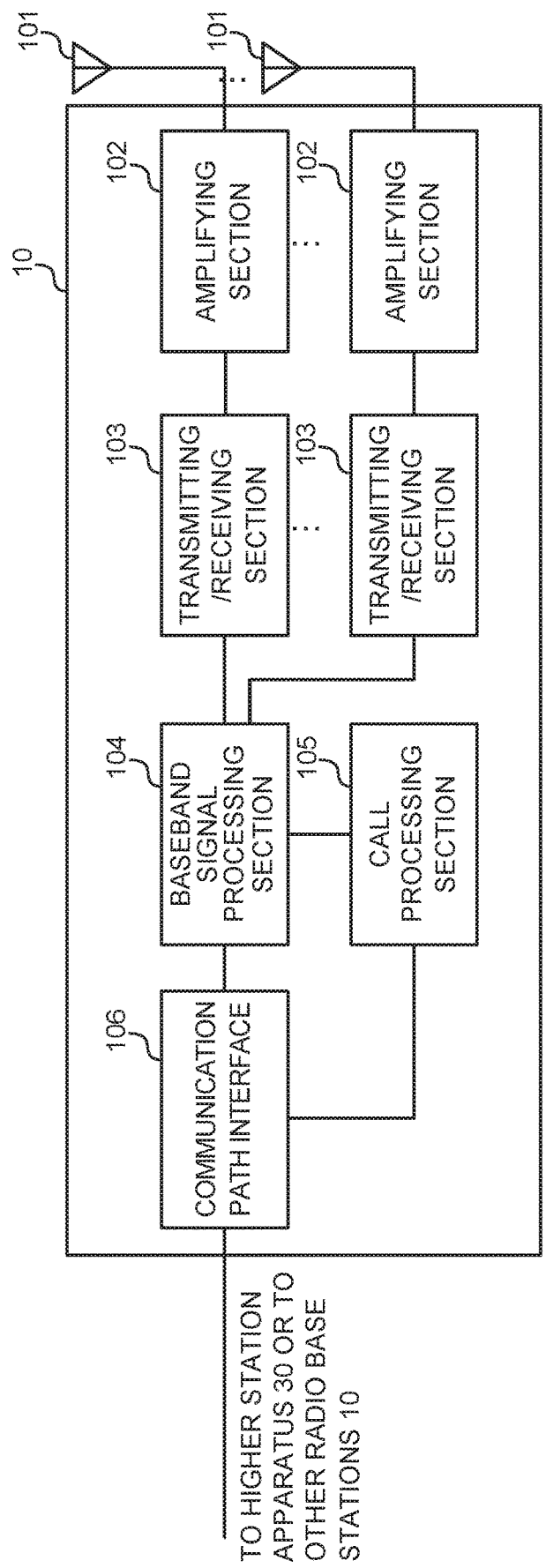
FIG. 3 is a diagram to show an example of an overall structure of a radio base station according to one embodiment.

FIG. 3 is a diagram to show an example of an overall structure of a radio base station according to one embodiment. Each radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving section 103 can be constituted by a transmitters/receiver, a transmitting/receiving circuit or transmitting/receiving apparatus that can be described based on general understanding of the technical field to which the present disclosure pertains. Note that the transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving section 103 may further include an analog beamforming section that performs analog beamforming. The analog beamforming section can be constituted by an analog beamforming circuit (for example a phase shifter, a phase shift circuit) or analog beamforming apparatus (e.g., a phase shifter) described based on general understanding of the technical field to which the present disclosure pertains. Also, the transmitting/receiving antenna 101 can be constituted by an array antenna, for example. Also, the transmitting/receiving section 103 is configured such that that single BF and multi BF can be used.

The transmitting/receiving section 103 may transmit a signal using a transmission beam and may receive a signal using a reception beam. The transmitting/receiving section 103 may transmit and/or receive a signal using a predetermined beam determined by the control section 301.

The transmitting/receiving section 103 may receive and/or transmit various types of information described in the above-described embodiments from/to the user terminal 20.

Figure 4:
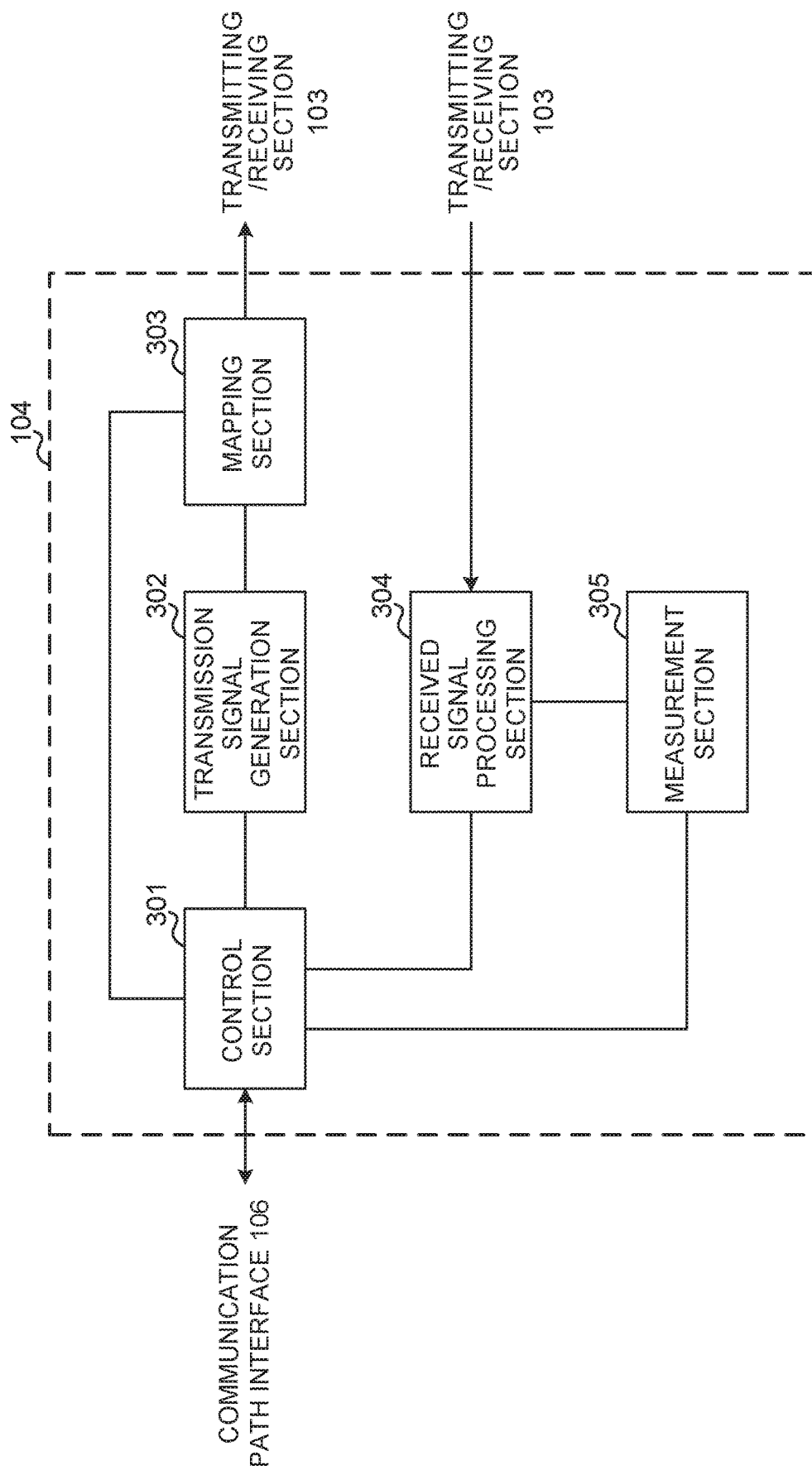
FIG. 4 is a diagram to show an example of a functional structure of a radio base station according to one embodiment.

FIG. 4 is a diagram to show an example of a functional structure of a radio base station according to one embodiment. Note that, although this example will primarily show functional blocks that pertain to characteristic parts of the present embodiment, the radio base station 10 may be assumed to have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present disclosure pertains.

The control section 301, for example, controls the generation of signals in the transmission signal generation section 302, the allocation of signals in the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgement information). The control section 301 controls the generation of downlink control signals, downlink data signals and so on, based on the results of deciding whether or not retransmission control is necessary for uplink data signals, and so on.

The control section 301 controls scheduling of synchronization signals (for example, PSS/SSS) and downlink reference signals (for example, CRS, CSI-RS, DMRS) and so on.

The control section 301 may use digital BF (for example, precoding) by the baseband signal processing section 104 and/or analog BF (for example, phase rotation) by the transmitting/receiving sections 103 to form a transmission beam and/or a reception beam.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generation apparatus that can be described based on general understanding of the technical field to which the present disclosure pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) reported from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present disclosure pertains.

The received signal processing section 304 performs receiving processes (for example demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). The received signal processing section 304 can be constituted by a signal processor, a signal processing circuit or signal processing apparatus that can be described based on general understanding of the technical field to which the present disclosure pertains.

The received signal processing section 304 outputs the decoded information that is acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present disclosure pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.) the signal strength (for example, RSSI (Received Signal Strength Indicator)), transmission path information (for example, CSI), and so on. The measurement results may be output to the control section 301.

The transmitting/receiving section 103 may transmit and/or receive various types of information described in the above-described embodiments to/from the user terminal 20. The transmitting/receiving section 103 may transmit downlink control information (DCI) regarding a transmit power control (TPC) command in a common search space. The DCI may be DCI format 2_2.

<User Terminal>

Figure 5:
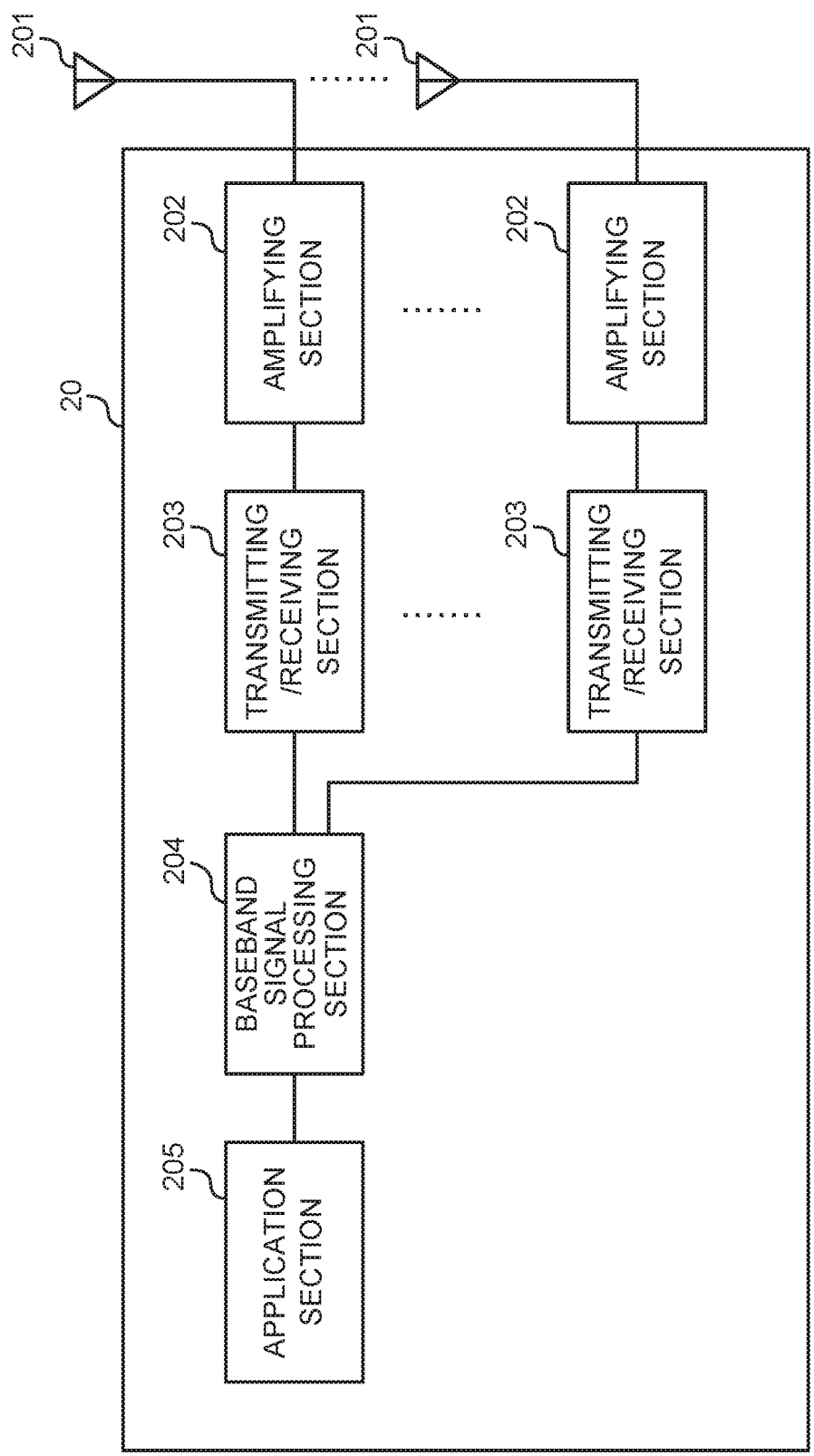
FIG. 5 is a diagram to show an example of an overall structure of a user terminal according to one embodiment.

FIG. 5 is a diagram to show an example of an overall structure of a user terminal according to one embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving section 203 can be constituted by a transmitters/receiver, a transmitting/receiving circuit or transmitting/receiving apparatus that can be described based on general understanding of the technical field to which the present disclosure pertains. Note that the transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, preceding, a discrete Fourier transform (DFT) process, an IFFT process and so on, and the result is forwarded to the transmitting/receiving section 203.

Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

Note that the transmitting/receiving section 203 may further include an analog beamforming section that performs analog beamforming. The analog beamforming section can be constituted by an analog beamforming circuit (for example, a phase shifter, a phase shift circuit) or analog beamforming apparatus (e.g., a phase shifter) described based on general understanding of the technical field to which the present disclosure pertains. Also, the transmitting/receiving antenna 201 can be constituted by an array antenna, for example. Also, the transmitting/receiving section 203 is configured such that that single BF and multi BF can be used.

The transmitting/receiving section 203 may transmit a signal using a transmission beam and may receive a signal using a reception beam. The transmitting/receiving section 203 may transmit and/or receive a signal using a predetermined beam determined by the control section 401.

Figure 6:
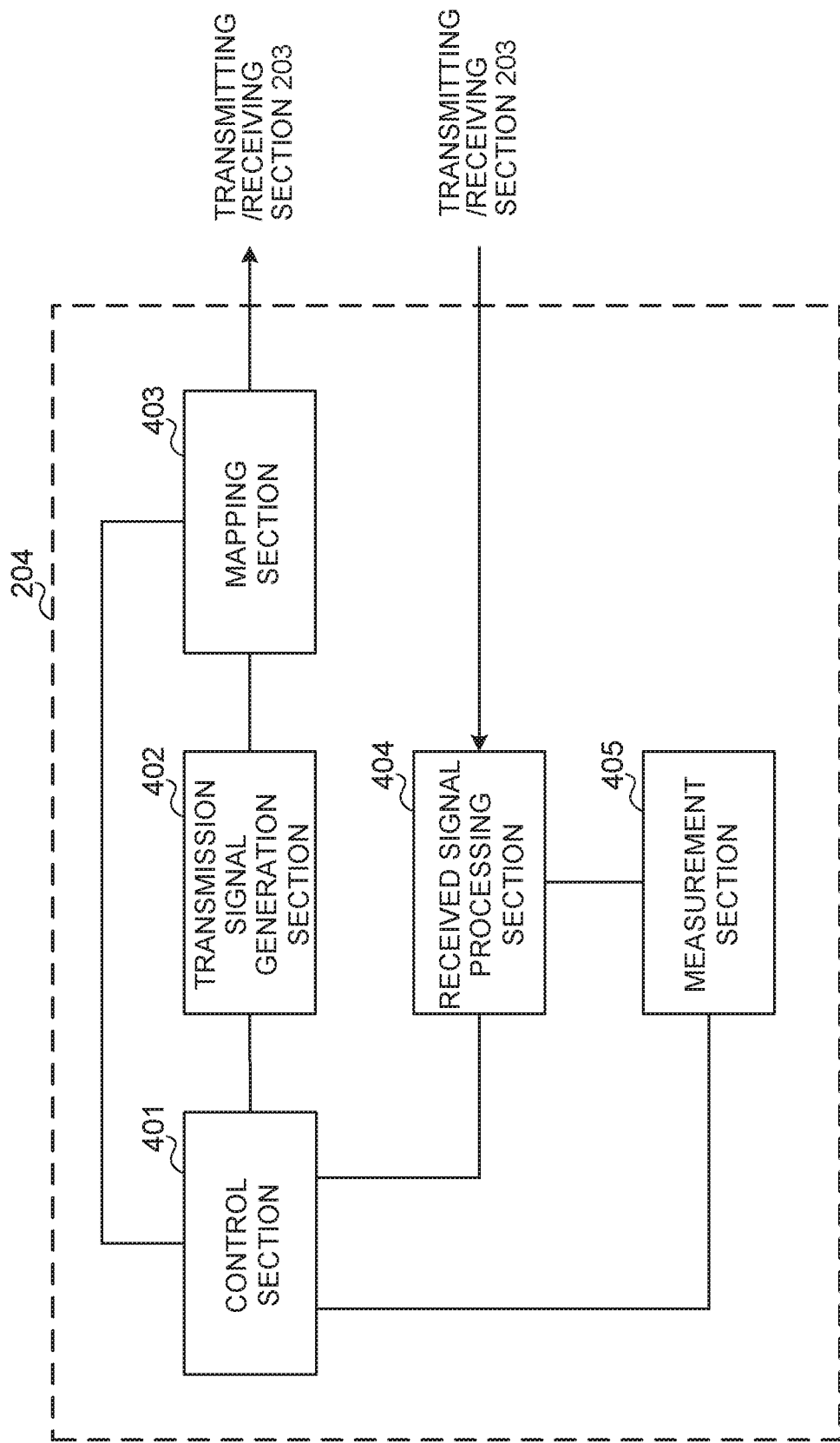
FIG. 6 is a diagram to show an example of a functional structure of a user terminal according to one embodiment.

FIG. 6 is a diagram to show an example of a functional structure of a user terminal according to one embodiment. Note that, although this example will primarily show functional blocks that pertain to characteristic parts of the present embodiment, it may be assumed that the user terminals 20 have other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit or control apparatus that can be described based on general understanding of the technical field to which the present disclosure pertains.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may use digital BF (for example, precoding) by the baseband signal processing section 204 and/or analog BF (for example, phase rotation) by the transmitting/receiving sections 203 to form a transmission beam and/or a reception beam.

Also, when the control section 401 acquires various types of information reported by the radio base station 10 from the received signal processing section 404, the control section 401 may update parameters used for control based on the information.

The transmission signal generation section 402 generates uplink signals (uplink control signals uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present disclosure pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving section 203. The mapping section 403 can be constituted by a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present disclosure pertains. Also, the received signal processing section 404 can constitute the receiving section according to the present disclosure.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present disclosure pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

The transmitting/receiving section 203 may receive and/or transmit various types of information described in the above-described embodiments from/to the radio base station 10. The transmitting/receiving section 203 may receive downlink control information (DCI) regarding a transmit power control (TPC) command transmitted in a common search space. The DCI may be DCI format 2_2.

The control section 401 may identify a carrier corresponding to the TPC command included in DCI format 2_2. The control section 401 may identify a carrier corresponding to a TPC command included in DCI format 2_2 when a plurality of UL carriers is set for the user terminal 20. The control section 401 may perform UL transmit power control (transmit power control of the PUSCH and so on) for at least one closed loop based on the TPC command.

The control section 401 may identify a carrier corresponding to a TPC command included in DCI format 2_2 based on the information regarding the position of the TPC command for each carrier included in DCI format 2_2.

The control section 401 may identify a carrier corresponding to a TPC command included in DCI format 2_2 based on the rule of arrangement order of the TPC commands included in DCI format 2_2.

The control section 401 may identify a carrier corresponding to a TPC command included in DCI format 2_2 based on the RNTI (Radio Network Temporary Identifier) corresponding to DCI format 2_2.

The control section 401 may identify a carrier corresponding to all TPC commands included in the DCI based on a value in a field (for example, carrier designation field) included in the DCI format 2_2.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically aggregated, or may be realized by directly or indirectly connecting two or more physically or logically separate pieces of apparatus (via wire or wireless, for example) and using these multiple pieces of apparatus.

Figure 7:
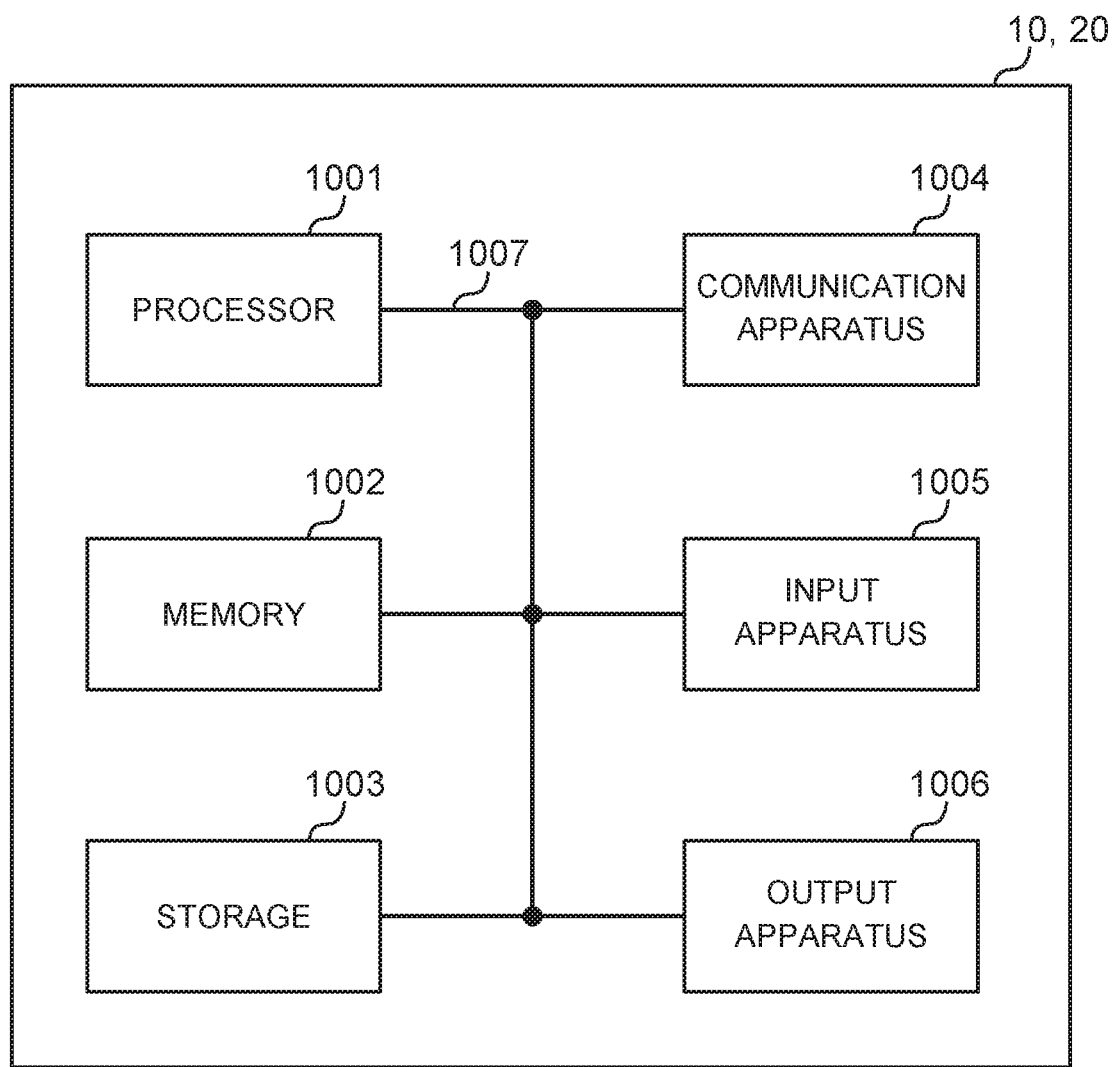
FIG. 7 is a diagram to show an example hardware structure of a radio base station and a user terminal according to one embodiment.

For example, the radio base station, user terminals and so on according to one embodiment of the present disclosure may function as a computer that executes the processes of the radio communication method of the present disclosure. FIG. 7 is a diagram to show an example hardware structure of a radio base station and a user terminal according to one embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be interpreted as "circuit," "device," "unit" and so on. Note that the hardware structure of the radio base stations 10 and the user terminals 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with a peripheral apparatus, a control apparatus, a computing apparatus, a register and so on. For example, the above-described baseband signal processing section 104 (204), call processing section 105 and so on may be implemented by the processor 1001.

Furthermore, the processor 1001 reads programs (program codes), software modules or data, from at least one of the storage 1003 and the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to one embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using at least one of wired network and wireless network, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in the present disclosure and the terminology that is needed to understand the present disclosure may be replaced by other terms that convey the same or similar meanings. For example, "channels" and "symbols" may be replaced by "signals" (or "signaling"). Also, "signals" may be replaced by "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

A radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Here, the numerology may be a communication parameter used for at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI a radio frame structure, a specific filtering process to be performed by a transceiver in the frequency domain a specific windowing process to be performed by a transceiver in the time domain and so on.

A slot may be comprised of one or more symbols in the time domain (OFDM (Orthogonal Frequency Division Multiplexing) symbols, SC-TDMA (Single Carrier Frequency Division Multiple Access) symbols, and so on). Also, a slot may be a time unit based on numerology.

Also, a slot may include a plurality of minislots. Each minislot may be comprised of one or more symbols in the time domain. Also, a minislot may be referred to as a "subslot." Each minislot may be comprised of fewer symbols than a slot. A PDSCH (or PUSCH) transmitted in a time unit larger than a minislot may be referred to as PDSCH (PUSCH) mapping type A. A PDSCH (or PUSCH) transmitted using a minislot may be referred to as PDSCH (PUSCH) mapping type B.

A radio frame, a subframe, a slot, a minislot and a symbol all represent the time unit in signal communication. A radio frame, a subframe, a slot, a minislot and a symbol may be each called by other applicable names.

For example, one subframe may be referred to as a "transmission time interval (TTI)," or a plurality of consecutive subframes may be referred to as a "TTI," or one slot or one minislot may be referred to as a "TTI." That is, at least one of a subframe and a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmit power that can be used in each user terminal) to allocate to each user terminal in TTI units. Note that the definition of TTIs is not limited to this.

The TTI may be the transmission time unit of channel-encoded data packets (transport blocks), code blocks, codewords and so on, or may be the unit of processing in scheduling, link adaptation and so on. Note that, when a TTI is given, the period of time (for example, the number of symbols) in which transport blocks, code blocks, codewords and so on are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "normal TTI, a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "minislot," "subslot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain.

Also, an RB may include one or more symbols in the time domain, and may be one slot, one minislot, one subframe or one TTI in length. One TTI and one subframe each may be comprised of one or more resource blocks.

Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in the present disclosure may be represented in absolute values or in relative values with respect to predetermined values, or may be represented using other applicable information. For example, a radio resource may be specified by a predetermined index.

The names used for parameters and so on in the present disclosure are in no respect limiting. In addition, an equation and so on using these parameters may differ from those explicitly disclosed in the present disclosure. Since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in the present disclosure, and other methods may be used as well. For example, reporting of information may be implemented by using physical layer signaling (for example, downlink control information (DCI) or uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup (RRCConnectionSetup) message RRC connection reconfiguration (RRCConnectionReconfiguration) message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files execution threads, procedures functions and so on.

Also, software, commands, information and so on may be transmitted and received via communication media. For example, when software is transmitted from a website, a server or other remote sources by using at least one of wired technologies (coaxial cables, optical fiber cables, twisted-pair cables, digital subscriber lines (DSL) and so on) and wireless technologies (infrared radiation, microwaves and so on), at least one of these wired technologies and wireless technologies are also included in the definition of communication media.

The terms "system" and "network" as used in the present disclosure are used interchangeably.

In the present disclosure, the terms "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", "bandwidth part (BWP)" may be used interchangeably. A base station may be referred to as a macro cell, a small cell, a femto cell, a pico cell and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of at least one of a base station and a base station subsystem that provides communication services within this coverage.

As used in the present disclosure, the terms "mobile station (MS)" "user terminal," "user equipment (UE)", "terminal" and so on may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

At least one of a base station and a mobile station may be referred to as transmitting apparatus, receiving apparatus and so on. Note that at least one of a base station and a mobile station may be a device mounted on a moving body, a moving body itself and so on. The moving body may be a transportation (for example, a car, an airplane and so on), an unmanned moving body (for example, a drone an autonomous car and so on), or a (manned or unmanned) robot. Note that at least one of a base station and a mobile station includes apparatus that does not necessarily move during a communication operation.

Furthermore, the radio base stations in the present disclosure may be interpreted as user terminals. For example, each aspect/embodiment of the present disclosure may be applied to a configuration in which communication between a radio base station and a user terminal is replaced with communication among a plurality of user terminals (may be referred to as, for example, D2D (Device-to-Device), V2X (Vehicle-to-Everything) and so on). In this case, user terminals 20 may have the functions of the radio base stations 10 described above. In addition, terms such as "uplink" and "downlink" may be interpreted as a term corresponding to communication between terminals (for example, "side"). For example, an uplink channel, a downlink channel and so on may be interpreted as a side channel.

Likewise, the user terminals in the present disclosure may be interpreted as radio base stations. In this case, the radio base stations 10 may have the functions of the user terminals 20 described above.

Certain actions which have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts and so on that have been used to describe the aspects/embodiments in the present disclosure may be re-ordered as long as inconsistencies do not arise. For example, although various methods have been illustrated in the present disclosure with various components of steps using exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these. Also, a plurality of systems may be combined (for example, LTE or LTE-A and 5G may be combined) and the aspects/embodiments may be applied to the combination.

The phrase "based on" as used in the present disclosure does not mean "based only on," unless otherwise specified. In other words, the phrase "based on" means both "based only on" and "based at least on."

Reference to elements with designations such as "first," "second" and so on as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The terms "judge" and "determine" as used in the present disclosure may encompass a wide variety of actions. For example, to "judge" and "determine" as used herein may be interpreted to mean making judgements and determinations related to judging, calculating, computing, processing, deriving, investigating, looking up (for example, searching a table, a database or some other data structure), ascertaining and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, to "judge" and "determine" as used herein may be interpreted to mean "assuming", "expecting", "considering" and so on.

As used in the present disclosure, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used in the present disclosure, when two elements are connected, these elements may be considered "connected" or "coupled" to each other by using one or more electrical wires, cables, printed electrical connections and so on, and, as a number of non-limiting and non-inclusive examples, by using electromagnetic energy, such as electromagnetic energy having wavelengths in the radio frequency, microwave and optical (both visible and invisible) regions.

In the present disclosure, the phrase "A and B are different" may mean "A and B are different from each other." The terms such as "leave", "coupled" and the like may be interpreted similarly.

When terms such as "include," "including" and variations of these are used in the present disclosure, these terms are intended to be inclusive, in a manner similar to the way the term "comprising" is used. Furthermore, the term "or" as used in the present disclosure is intended to be not an exclusive disjunction.

In the present disclosure, when articles, such as "a", "an", and "the" in English are added by translation, the present disclosure may cover states where the noun that follows these articles is in the plural form.

Now, although the invention according to the present disclosure has been described in detail above, it should be obvious to a person skilled in the art that the invention according to the present discloser is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2018-090963 filed on Apr. 18, 2018. All disclosure of the application is herein incorporated.

The invention claimed is:

1. A terminal comprising:
    a receiving section that receives downlink control information (DCI) regarding transmit power control (TPC) commands transmitted in a common search space; and
    a control section that identifies a position of a TPC command corresponding to each of carriers included in the DCI based on information regarding positions of the TPC commands for the respective carriers in a cell,
    wherein the information regarding the positions of the TPC commands for the respective carriers in the cell is information regarding a certain bandwidth part (BWP).

2. The terminal according to claim 1, wherein the information regarding the positions of the TPC commands for the respective carriers in the cell is information indicating first positions of the TPC commands corresponding to the respective carriers.

3. A radio communication method for a terminal comprising:
    receiving a downlink control information (DCI) regarding transmit power control (TPC) commands transmitted in a common search space; and
    identifying a position of a TPC command corresponding to each of carriers included in the DCI based on information regarding positions of the TPC commands for the respective carriers in a cell,
    wherein the information regarding the positions of the TPC commands for the respective carriers in the cell is information regarding a certain bandwidth part (BWP).

4. A base station comprising:

transmitting a downlink control information (DCI) regarding transmit power control (TPC) commands in a common search space to a terminal; and receiving uplink transmission whose transmit power is controlled by a TPC command corresponding to a carrier, a position of the TPC command corresponding to each of carriers included in the DCI being identified by the terminal based on information regarding positions of the TPC commands for the respective carriers in a cell, wherein the information regarding the positions of the TPC commands for the respective carriers in the cell is information regarding a certain bandwidth part (BWP).

* * * * *